Dec. 7, 1971        F. P. CROSBY        3,624,953
TERMITE CONTROL SYSTEM
Filed Dec. 10, 1969        2 Sheets-Sheet 1
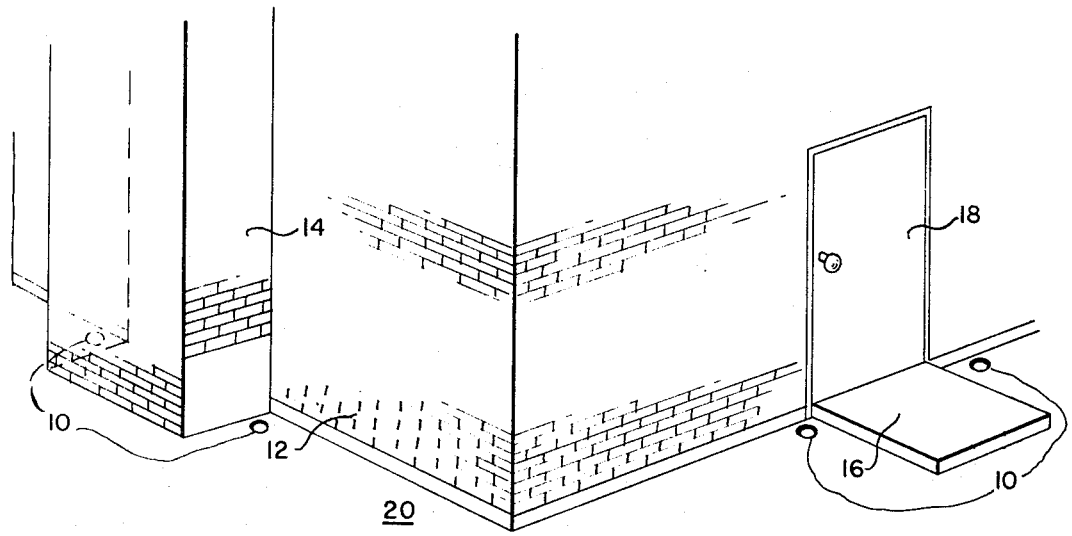
FIG. 1
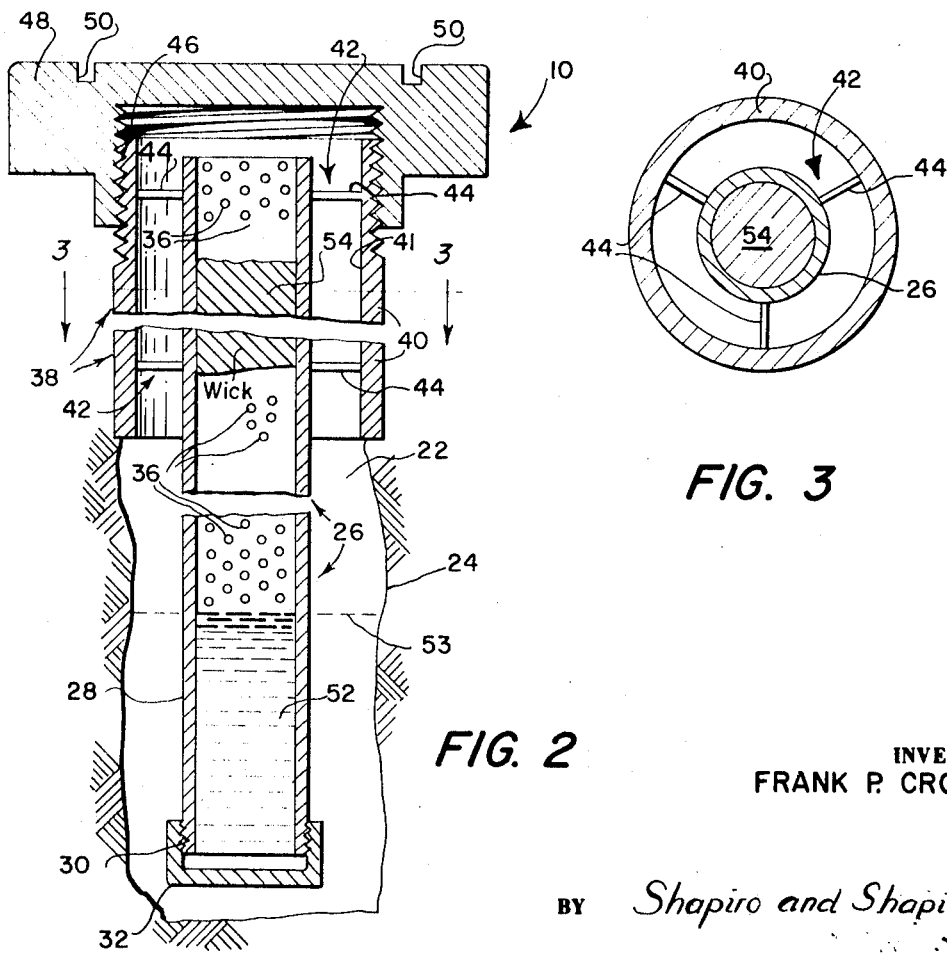
FIG. 2
FIG. 3
INVENTOR
FRANK P. CROSBY
BY *Shapiro and Shapiro*
ATTORNEYS Dec. 7, 1971   F. P. CROSBY   3,624,953
TERMITE CONTROL SYSTEM
Filed Dec. 10, 1969   2 Sheets-Sheet 2

INVENTOR
FRANK P. CROSBY

BY *Shapiro and Shapiro*

ATTORNEYS

3,624,953
TERMITE CONTROL SYSTEM
Frank P. Crosby, 5033 Mangum Road,
College Park, Md. 20740
Filed Dec. 10, 1969, Ser. No. 883,794
Int. Cl. A01m 1/20
U.S. Cl. 43—131      5 Claims

ABSTRACT OF THE DISCLOSURE

A termite control system includes an insecticide dispensing pipe vertically disposed within a hole adjacent to a dwelling. The pipe has a lower unperforated portion for receiving a liquid insecticide and an upper portion having perforations through which the insecticide is dispensed in vapor form. A sleeve is provided at the upper end of the hole for mounting the pipe with its outer surface spaced inwardly from the walls of the hole so that the insecticide in vapor form may permeate the soil surrounding the hole. A wick may be provided within the pipe to facilitate transfer of the liquid upwardly in the pipe.

BACKGROUND OF THE INVENTION

This invention relates to insecticide dispensing apparatus and, more particularly, to apparatus for controlling termites adjacent to building structures.

Termites, which enter buildings from the surrounding soil, are attracted by the wood, or other cellulosic material, employed in the building structure and, if unchecked, can cause considerable damage thereto. As a result, the public has, in the past, gone to considerable expense to exterminate termites after they have invaded a building or, in the alternative, to erect barriers to the entrance of termites to the building. However, prior art approaches to termite prevention have tended to be complex and expensive. Elaborate schemes of pipes under and surrounding buildings have been proposed, and it has been suggested that these pipes be coupled to expensive pumping systems whereby liquid insecticides or termiticides may be dispensed into the soil surrounding the building to provide a barrier to the incursion of termites. It is also a frequent practice to employ commercial exterminating organizations to saturate the soil surrounding the building with insecticide. However, such prior art expedients are unduly expensive and inconvenient for the average householder.

SUMMARY OF THE INVENTION

It is accordingly the principal object of the present invention to provide an improved termite control system.

More specifically, it is an object of the present invention to provide a relatively inexpensive termite control system requiring no complex machinery and not requiring a complicated piping system. It is a further object of the invention to provide an insecticide dispensing apparatus which may be easily serviced by the householder himself without reliance upon commercial insecticide dispensing organizations.

Briefly, according to the present invention, an insecticide dispensing pipe is provided having a lower unperforated portion and an upper portion having a plurality of perforations. The lower portion is adapted to receive a liquid insecticide, such as controlled creosote, which will slowly evaporate and be dispensed in vapor form through the perforations. The pipe is positioned within a hole provided in the ground with the outer walls of the pipe spaced from the walls of the hole so that insecticide vapor passing through the perforations of the pipe will permeate the surrounding soil. In order to so position the pipe, a mounting sleeve is snugly received at the upper end of the hole and has a mounting spider for supporting the pipe centrally of the hole. In order to facilitate the transference of liquid insecticede upwardly in the pipe, a woven wick may be provided within the pipe. A cap may be threadedly engaged with the top of the sleeve to cover the hole and pipe. A plurality of such termite control devices are positioned at strategic spaced points adjacent to a dwelling house.

The foregoing and other objects, advantages, and features of the invention and the manner in which the same are accomplished will become more readily apparent upon consideration of the following detailed description of the invention when taken in conjunction with the accompanying drawings, which illustrate a preferred and exemplary embodiment.

BRIEF DESCRIPTION OF THE DRAWINGS

FIG. 1 is a partial perspective view of a dwelling having a plurality of termite control devices of the invention installed nearby;

FIG. 2 is a section view of a termite control device of the invention, partially broken away;

FIG. 3 is a section view, taken along lines 3—3 of FIG. 2; and

DETAILED DESCRIPTION

Figure 4:
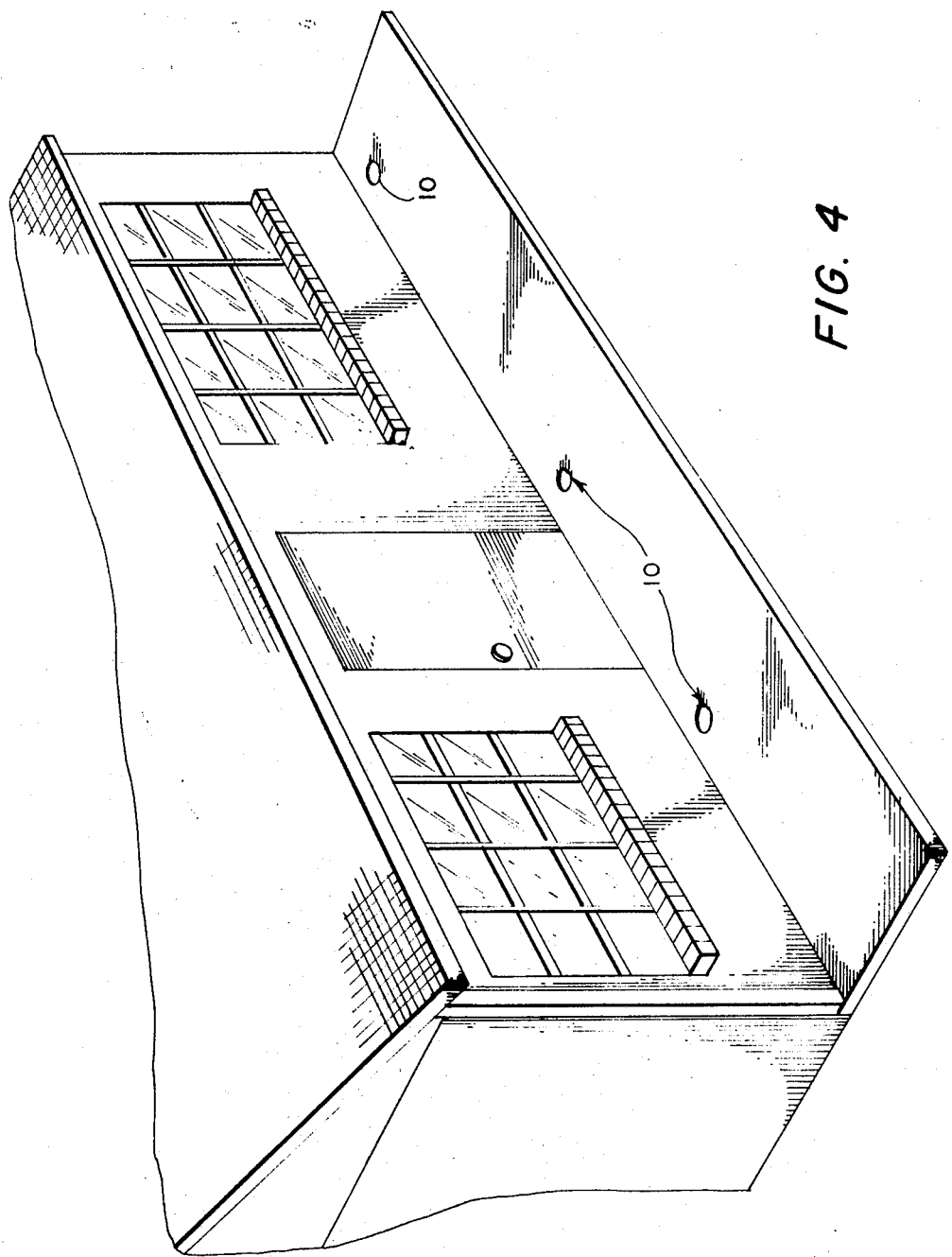
FIG. 4 is a partial perspective view of a dwelling having a plurality of termite control devices of the invention installed through a concrete slab patio.

Referring to FIG. 1, a plurality of termite control devices 10 are shown installed adjacent to a dwelling 12. While termite control devices 10 according to the present invention could be positioned at spaced intervals about the entire periphery of dwelling 12, it is particularly important that the devices be positioned at locations favored by termites as point of entry into the dwelling. For this reason, a pair of termite control devices 10 are shown in FIG. 1 as positioned adjacent to the chimney 14 of the dwelling; and a second pair of termite devices 10 are shown installed on either side of the stoop 16 adjacent the door 18 of the dwelling. As indicated, the termite control devices 10 may be positioned directly in the ground 20 as shown in FIG. 1; or, as illustrated in FIG. 4 where a concrete slab patio 21 covers the ground adjacent one side of dwelling 12 near door 18, they may be positioned through the concrete slab structure 21. In each of these cases, the termite control devices 10 should be spaced approximately six inches from the wall of building 12.

Turning to FIG. 2, it will be seen that a termite control device 10 is positioned within a vertical hole 22 having a vertical wall 24. In a typical installation, hole hole 22 will have a diameter of about four inches. The termite control device 10 includes a vertically disposed insecticide dispensing pipe 26, which may be made of aluminum or some other equivalent non-corroding material, and which may have an outer diameter of about two inches. It will be observed that pipe 26 includes a lower unperforated portion 28, which will have a length of from two to four inches. The lower end 30 of portion 28 is threaded externally to receive a cap 32 for closing the lower end of the pipe. Dispensing pipe 26 includes an upper portion 34 provided with a plurality of perforations 36. These perforations will serve to dispense an insecticide in vapor form as will be explained more fully hereinbelow and will typically have a size of ¼ inch to ½ inch in diameter. The bottom end of pipe 26 is preferably no more than one foot above the footings of the dwelling.

In order to support pipe 26 within hole 22 spaced from wall 24 thereof, a mounting structure, or supporting means, 38 is provided. This mounting structure comprises a sleeve 40 which is snugly received within hole 22 bearing tightly against wall 24 thereof to be maintained and positioned therein. If, as already mentioned, hole 22 is about four inches in diameter, the outer diameter of sleeve 40 will be about, or slightly greater than, four inches. A pair of mounting spiders 42 are supported on the inner surface 41 of sleeve 40 and consist of a plurality of supporting rods 44 welded to inner wall 41 and extending inwardly of the sleeve. The inner ends of rods 44 are welded to the outer surface of pipe 26 to support pipe 26 centrally of sleeve 40. As will be seen in FIG. 3, each of spiders 42 may comprise three equispaced supporting rods 44. However, it is to be understood that a large number of rods, such as four, may be employed.

The upper end of sleeve 40 is externally threaded as shown at 46 to receive a threaded cap 48 thereon for covering the upper end of the sleeve 40 and pipe 26. In order to facilitate handling of cap 48 holes 50 may be provided for receiving a suitable tool. It is to be understood that sleeve 40 will be so positioned with respect to the ground surface that, in the case of installation directly into the ground, as adjacent chimney 14, sleeve 40 will be positioned at such a level that the top surface of cap 48 may be made flush with the ground surface. Likewise, in the case of an installation through a concrete structure, such as stoop 16, the position of sleeve 40 will be such that cap 48 may, when installed on sleeve 40, be made flush with the surface of stoop 16.

As already mentioned pipe 26 is preferably an aluminum pipe. Caps 32 and 48, sleeve 40, and spiders 42, comprising rods 44, are also preferably aluminum.

After the holes 22 have been drilled or dug, and after the apparatus has been installed in the manner shown in FIG. 2, with cap 48 removed, a liquid insecticide 52, such as controlled creosote or some other slowly volatile liquid insecticide is poured through the top of pipe 26 filling bottom portion 28 thereof to a level 53 just below top portion 34. The insecticide is then free to evaporate and be dispensed in vapor form through perforations 36 to permeate the soil surrounding hole 22. In order to facilitate the upward movement of the liquid 52 and provide more efficient evaporation thereof, a wick 54 may be provided. This wick may be made of woven fiberglass and will extend from the bottom of pipe 26 up to the top thereof.

After the pipe 26 has been filled with liquid insecticide 52 to level 53 just below the perforations 36, cap 48 is placed thereover so as to keep the evaporated insecticide from escaping out the top end of the device. As the liquid insecticide evaporates, having been lifted upwardly in the pipe by wick 54, it travels through perforations 36 in vapor form to permeate the soil surrounding hole 22, thus providing a barrier to the incursion of termites. The householder will periodically inspect the apparatus by removing cap 48 to ascertain whether all of liquid insecticide 52 therein has evaporated. If this is the case, additional liquid insecticide may be readily added to the dispensing pipe 26 until it again reaches level 53 just below perforations 36.

While a preferred embodiment of the invention has been shown and described, it will be apparent to those skilled in the art that changes can be made without departing from the principles and spirit of the invention, the scope of which is defined in the appended claims.

The invention claimed is:

1. Termite control apparatus comprising: an insecticide dispensing pipe, said pipe having a lower unperforated portion adapted to receive a liquid insecticide and an upper portion provided with a plurality of perforations adapted to dispense said insecticide in vapor form therethrough; supporting means for supporting said pipe vertically within a hole provided in the ground, said supporting means including a sleeve adapted to fit snugly within said hole at the upper end thereof and mounting means for supporting the upper end of said pipe on said sleeve with the outer surface of said pipe maintained in spaced relation to the inner wall of said sleeve so that the outer surface of said pipe will be spaced from the vertical wall of said hole, whereby an insecticide received within the lower portion of said pipe will be dispensed in vapor form through said perforation and permeate the soil surrounding said hole; and removable closure means engaged with said sleeve for covering said hole and said pipe to prevent said insecticide in vapor form from escaping from the top of said hole.

2. Termite control apparatus as recited in claim 1, further comprising a wick positioned within said pipe and extending from said lower portion through said upper portion to convey liquid insecticide upwardly through said pipe for evaporation adjacent said perforations.

3. Termite control apparatus as recited in claim 1, wherein said mounting means comprises a spider extending inwardly from the inner surface of said sleeve and secured to the upper end of said pipe.

4. Termite control apparatus as recited in claim 1, wherein said closure means comprises a cap engaged with the upper end of said sleeve to cover said hole and said pipe.

5. A termite control system comprising a plurality of termite control apparatus as recited in claim 1 positioned in holes provided at spaced points adjacent a building.

References Cited
UNITED STATES PATENTS

| | | | |
|---|---|---|---|
| 1,422,831 | 7/1922 | Camp | 43—129 |
| 3,397,542 | 8/1968 | Moulden | 47—48.5 X |
| 1,056,535 | 3/1913 | Grimes et al. | 43—131 |
| 1,727,457 | 9/1929 | Van Meter | 43—124 X |
| 2,592,022 | 4/1952 | Gallant | 43—131 |
| 2,931,140 | 4/1960 | Laffler et al. | 47—48.5 |

WARNER H. CAMP, Primary Examiner

U.S. Cl. X.R.

43—124